May 19, 1925.
S. DYHR
ELECTRIC WELDING
Filed Aug. 26, 1921
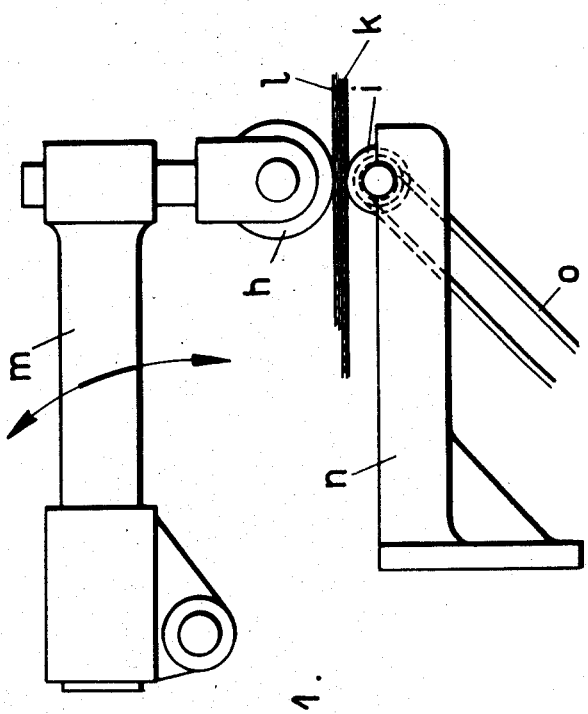
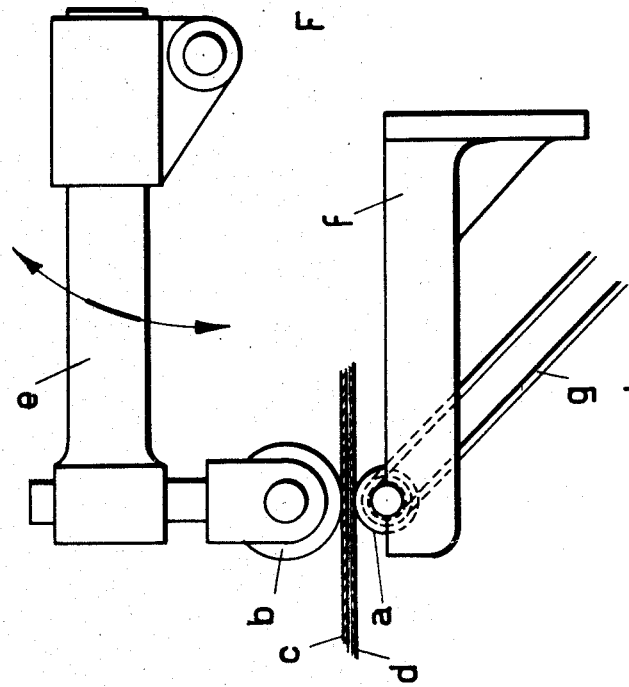
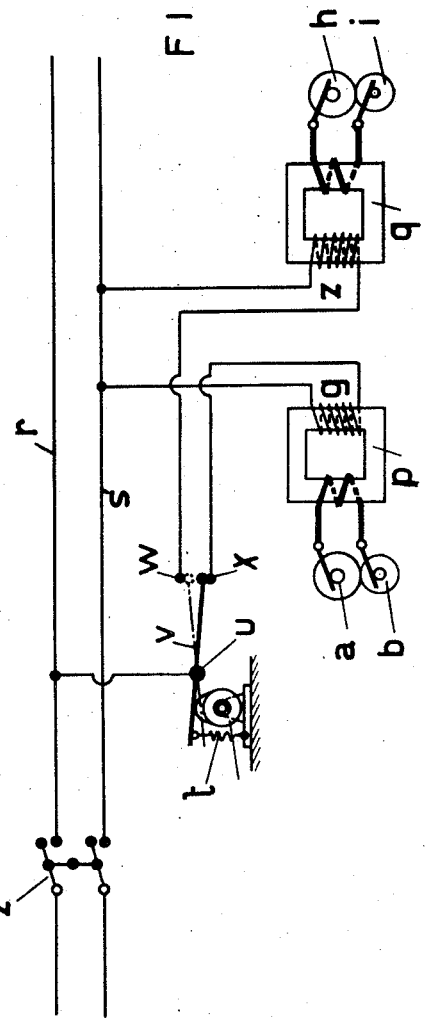
1,538,278
INVENTOR:

Patented May 19, 1925.

1,538,278

UNITED STATES PATENT OFFICE.

SVEND DYHR, OF BERLIN-CHARLOTTENBURG, GERMANY, ASSIGNOR TO DEUTSCHE-SCHWEISSMASCHINEN-FABRIK, BECKER & CO., A. G., OF BERLIN-SCHONEBERG, GERMANY.

ELECTRIC WELDING.

Application filed August 26, 1921. Serial No. 495,770.

(GRANTED UNDER THE PROVISIONS OF THE ACT OF MARCH 3, 1921, 41 STAT. L., 1313.)

*To all whom it may concern:*

Be it known that I, SVEND DYHR, a citizen of Denmark, residing at No. 72/73 Knesebeckstrasse, Berlin - Charlottenburg, Germany, have invented certain new and useful Improvements in Electric Welding (for which I have filed applications in Germany, Oct. 3, 1918; Switzerland, Mar. 15, 1920; France, Mar. 15, 1920; Italy, Mar. 22, 1920; Belgium, Apr. 8, 1920; Spain, Apr. 9, 1920; England, May 1, 1920), of which the following is a specification.

My invention relates to an electric resistance method of welding which is particularly adapted for joining metal sheets by long welded seams. The method of joining sheets by a seam formed of a row of spot welds produced one after the other by means of a pair of electrodes is known, and it has also been proposed to supply electricity to a number of electrical welding machines alternately so that they may not all take current from the supply mains simultaneously.

My invention relates more particularly to improvements in methods of producing a number of seams at the same time or collaterally, and by means of these improvements the process is adapted to be carried out with the aid of roller electrodes and it is rendered economical and capable of producing welded seams of a high quality.

An essential feature of the invention consists in two seams being joined collaterally by means of two pairs of electrodes which are supplied with current from the same mains and which weld the seams of two pieces of work, or of one and the same piece of work, point by point in such a manner that, in the currentless intervals of the one pair of electrodes executing the one seam, welding current impulses are sent through the other pair of electrodes producing the other seam, the duration of the said impulses being as great, or almost as great, as that of the said currentless intervals. In other words current impulses are alternately sent through the two pairs of electrodes and the duration of the impulses of each series of impulses is equal or nearly equal to the intervals between them. There is a certain relation between the durations of the impulses and the currentless intervals between them at which the most favorable result as to economy of working, quality of the seams, speed of welding and accuracy of the indications of the current meter, are obtained.

The invention will now be described with reference to the accompanying drawing, in which—

Fig. 1 is a side view of the essential parts of a type of device that may be used in carrying out the invention, and Fig. 2 shows a suitable circuit arrangement for the device.

$a$ and $b$ represent a pair of roller electrodes of a welding machine, and $c$ and $d$ are two metal sheets that are to be joined by a welded seam. The upper roller electrode $b$ is arranged to be swung up and down in the ordinary way with a pivoted electrode arm $e$ by means of which it can be pressed down upon the work $c$—$d$. The lower roller electrode $a$ is journalled in a fixed electrode arm $f$. One of the roller electrodes, say $a$, is arranged to be rotated by a mechanical driving means, such as a belt or cord $g$.

The two other roller electrodes $h$ and $i$, between which the two metal sheets $k$ and $l$ are also to be joined together by a long welded seam, are similarly arranged on a hinged electrode arm $m$ and a rigid electrode arm $n$, the one roller electrode $i$ being arranged to be rotated by a driving means $o$ as in the case of the other pair of electrodes.

Now if the two pairs of electrodes are made to operate in such a way that the metal sheets ($c$ and $d$ and $k$ and $l$) to be welded together pass through the bites of the rollers, and the intervals of welding are timed in such a manner that each interval between two welding operations or welding current impulses at the one seam is occupied or almost fully occupied by a welding current impulse at the other seam, the current taken from the current mains will be continuous or practically continuous, instead of consisting of impulses.

The alternate switching on and off of the primary current of the two welding machines, which results in welding impulses alternately flowing in the secondary circuits, and thus through the pairs of electrodes, may be effected in any suitable known manner. A suitable arrangement for this purpose is diagrammatically illustrated in Fig. 2, in which the roller electrodes a, b are shown connected to the secondary winding of a transformer p, and the roller electrodes h, i are connected to the secondary side of a transformer g. The primary windings of the transformers receive current from the alternating current mains r and s through the medium of a two way switch u. This switch may comprise a circuit closer v adapted to be oscillated between the contacts w and x by means of a cam r and a spring t. Current impulses are thus sent alternately over the contacts x and w through the primary coil g of the transformer p and the primary coil z of the transformer q, this resulting in alternate welding current impulses flowing through the pairs of electrodes a, b and h, i, so that welds are executed alternately by means of these electrodes a, b and h, i.

The whole welding equipment may be switched off by a main switch z'.

I claim:

1. The method of electric resistance welding which comprises supplying current from the same mains to two pairs of continuously advancing disc-shaped roller electrodes, causing such electrodes to weld separate seams spot by spot, in such manner that a current impulse for welding a spot is sent alternately through one and the other pair of electrodes, and keeping the duration of the impulses and intervals approximately equal.

2. The method of electric resistance welding which comprises supplying current from the same mains to two pairs of continuously advancing disc-shaped roller electrodes, causing such electrodes to weld separate seams spot by spot in such manner that a current impulse for welding a spot is sent alternately through one and the other pair of electrodes, and keeping the duration of the impulses and intervals equal.

3. The method of electric resistance welding which comprises supplying current from the same mains to two pairs of continuously advancing disc-shaped roller electrodes, causing such electrodes to weld separate seams spot by spot on different work pieces in such manner that a current impulse for welding a spot is sent alternately through one and the other pair of electrodes, and keeping the duration of the impulses and intervals approximately equal.

4. The method of electric resistance welding which comprises supplying current from the same mains to two pairs of continuously advancing disc-shaped roller electrodes, causing such electrodes to weld separate seams spot by spot on different work pieces in such manner that a current impulse for welding a spot is sent alternately through one and the other pair of electrodes, and keeping the duration of the impulses and intervals equal.

5. The method of electric resistance welding which consists in alternately supplying an alternating current impulse from the same mains to two pairs of continuously advancing disc-shaped roller electrodes welding different seams, each pair being inserted in a separate secondary circuit of a transformer and interrupting the primary circuit in such manner that the duration of the impulses transmitted to each pair of electrodes is equal to the duration of the intervals between such impulses.

In testimony whereof I have signed this specification in the presence of two witnesses.

SVEND DYHR.

Witnesses:
MICHELIN TELIOFF,
PAUL ZARS.